US008797762B2

(12) United States Patent
Yamaguchi

(10) Patent No.: US 8,797,762 B2
(45) Date of Patent: Aug. 5, 2014

(54) DEVICE FOR ACQUIRING INFORMATION REGARDING THE INSIDE OF A TIRE

(75) Inventor: Shigeru Yamaguchi, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 315 days.

(21) Appl. No.: 13/133,888

(22) PCT Filed: Dec. 8, 2009

(86) PCT No.: PCT/JP2009/006687
§ 371 (c)(1),
(2), (4) Date: Aug. 8, 2011

(87) PCT Pub. No.: WO2010/067580
PCT Pub. Date: Jun. 17, 2010

(65) Prior Publication Data
US 2011/0292630 A1 Dec. 1, 2011

(30) Foreign Application Priority Data

Dec. 9, 2008 (JP) ................... 2008-313289
Dec. 19, 2008 (JP) ................... 2008-323843

(51) Int. Cl.
*H05K 7/14* (2006.01)
*H05K 7/18* (2006.01)
*H05K 7/00* (2006.01)
*H05K 5/00* (2006.01)
*H02B 5/00* (2006.01)
*H01R 13/46* (2006.01)
*H01L 23/28* (2006.01)

(52) U.S. Cl.
USPC ........... 361/796; 361/760; 361/783; 361/600; 174/520; 174/521

(58) Field of Classification Search
USPC ............ 174/50, 520, 521, 260; 361/760, 783, 361/796, 807
See application file for complete search history.

(56) References Cited

U.S. PATENT DOCUMENTS 5,430,330 A * 7/1995 Takahama et al. ............ 257/788
6,058,780 A   5/2000 Bernot et al.
(Continued)

FOREIGN PATENT DOCUMENTS

CA  2 660 428 A1  2/2008
JP  59-110313 A  6/1984
(Continued)

OTHER PUBLICATIONS

Machine Translation—English Nakao Tsutomu 'Sensor Module and PNeumatic Tire Having Same'.*

(Continued)

*Primary Examiner* — Jenny L Wagner
*Assistant Examiner* — Ahmad D Barnes
(74) *Attorney, Agent, or Firm* — Sughrue Mion, PLLC

(57) ABSTRACT

A tire inside information acquiring device (100) attached inside a tire-wheel assembly, includes a housing body (10) configured to house a receiving antenna for receiving a radio signal and an electronic circuit unit connected to the receiving antenna, the electronic circuit unit constitutes the tire inside information acquiring device (100), and a substrate (40) on which the housing body (10) and a component constituting the tire inside information acquiring device (100) are disposed. The housing body (10) is formed of a nonmetallic inorganic material. The component is only formed of parts having water resistance.

5 Claims, 8 Drawing Sheets

(56) References Cited

U.S. PATENT DOCUMENTS

| | | | |
|---|---|---|---|
| 6,854,324 B2* | 2/2005 | Landes et al. | 73/146 |
| 2002/0046599 A1* | 4/2002 | Chuang et al. | 73/146 |
| 2010/0148950 A1* | 6/2010 | Yamaguchi et al. | 340/442 |

FOREIGN PATENT DOCUMENTS

| | | |
|---|---|---|
| JP | 6-314928 A | 11/1994 |
| JP | 8-330751 A | 12/1996 |
| JP | 11-321256 A | 11/1999 |
| JP | 2005-241530 A | 9/2005 |
| JP | 2006-234481 A | 9/2006 |
| JP | 2007-178214 A | 7/2007 |
| WO | 2008/018585 A1 | 2/2008 |

OTHER PUBLICATIONS

Australian Office Action issued in Australian Application No. 2009325699 dated Dec. 17, 2012.
International Search Report of PCT/JP2009/006687 dated Mar. 23, 2010.
Canadian Office Action, dated Mar. 26, 2013, issued in corresponding Canadian Patent Application No. 2,746,161.
Japanese Official Action Letter, dated Nov. 26, 2013, issued in counterpart Japanese Patent Application No. 2010-542011. English translation.

* cited by examiner

US 8,797,762 B2

DEVICE FOR ACQUIRING INFORMATION REGARDING THE INSIDE OF A TIRE

CROSS REFERENCE TO RELATED APPLICATIONS

This application is a National Stage of International Application No. PCT/JP2009/006687 filed Dec. 8, 2009, claiming priority based on Japanese Patent Application Nos. 2008-313289, filed Dec. 9, 2008 and 2008-323843 filed Dec. 19, 2008, the contents of all of which are incorporated herein by reference in their entirety.

TECHNICAL FIELD

The present invention relates to a tire inside information acquiring device which is disposed inside a tire-wheel assembly, and which is configured to acquire information on the inside of the tire, such as the inner pressure of the tire or the temperature of the inside of the tire-wheel assembly.

BACKGROUND ART

A method in which a tire inside information acquiring device formed from a sensor module and a wireless communication device is attached inside a tire-wheel assembly, for example, on a rim portion of a rim wheel has been widely used in order to monitor tire inside information such as an inner pressure of the air filled in the tire-wheel assembly obtained by mounting the tire in the rim wheel, and the temperature of the inside of the tire-wheel assembly.

Moisture penetrating into such a tire inside information acquiring device may cause failure in electronic components constituting the tire inside information acquiring device.

In this respect, a method has been known in which: the tire inside information acquiring device is housed in a resin case; and the penetration of moisture into the resin case is prevented (for example, Patent Document 1). Such a tire inside information acquiring device is capable of reducing the incidence of failure in electronic components, because the penetration of moisture into the tire inside information acquiring device is prevented.

PRIOR ART DOCUMENT

Patent Document

Patent Document 1: Japanese Patent Application Publication No. 2006-234481 (Pages 5 to 6, and FIG. 2)

SUMMARY OF THE INVENTION

In the meantime, in a case of a large tire-wheel assembly for a construction vehicle or the like, a method in which a small amount of water or a small amount of dedicated coolant obtained by adding an additive to water is injected into the large tire-wheel assembly (for example, in an amount of approximately 1/50 of the inner capacity of the tire-wheel assembly) has been employed in order to lower the temperature of the tire in which heat is generated due to its rolling on a very uneven road.

In general, the inner pressure of such a large tire-wheel assembly is as high as 700 kPa to 900 kPa. In addition, the temperature of the inside of the tire-wheel assembly becomes high due to the above-mentioned heat generation in the tire. When a liquid such as LLC is injected into such a tire-wheel assembly, the inside of the tire-wheel assembly is filled with a high-humidity and high-pressure gas.

There is a problem that, even though a tire inside information acquiring device housed in a resin case is disposed inside a tire-wheel assembly filled with such a high-humidity and high-pressure gas, the penetration of moisture into the tire inside information acquiring device cannot be prevented sufficiently. In other words, there is a problem that the incidence of failure in electronic components constituting the tire inside information acquiring device housed in the resin case increases because the high-humidity and high-pressure gas permeates through the resin case.

In this respect, an object of the present invention is to provide a tire inside information acquiring device whose incidence of failure can be reduced even when the tire inside information acquiring device is disposed inside a tire-wheel assembly filled with a high-humidity and high-pressure gas due to the injection of a dedicated coolant or the like To solve the problem described above, a first feature of the present invention has following feature. A tire inside information acquiring device (tire inside information acquiring device 100) attached inside a tire-wheel assembly and configured to acquire tire inside information, which is information on the inside of the tire, the tire inside information acquiring device includes: an electronic circuit unit (microcomputer 20, RF modulation IC 22, capacitor 24, quartz oscillator 26, or LF demodulation IC 28); a housing body (housing body) configured to house the electronic circuit unit; and a sealing mean configured to hermetically seal the housing body with no gaps, wherein the housing body is formed of a nonmetallic inorganic material.

In such a tire inside information acquiring device, the electronic circuit unit is housed in the housing body formed of the nonmetallic inorganic material which is an inorganic material of a nonmetal, and the housing body is sealed with a seal with no gaps.

For this reason, even in a case where the inside of the tire-wheel assembly is filled with a high-humidity and high-pressure gas, it is possible to sufficiently prevent the permeation of moisture into the housing body. Accordingly, even when the tire inside information acquiring device is attached inside a tire-wheel assembly which is filled with the high-humidity and high-pressure gas due to the injection of a dedicated coolant or the like, the incidence of failure can be reduced.

A pressure sensor needs to be provided in order to monitor the pressure of the inside of the tire-wheel assembly as a piece of the tire inside information. A pressure sensor-equipped sensor module in which only a pressure inlet tube juts out beyond a resin case and all the electronic components, except for the pressure sensor, are hermetically enclosed in the resin case has been known as means configured to measure the inner pressure of the tire-wheel assembly accurately (for example, Japanese Patent Application Publication No. 2006-243382 (Pages 5 to 6, and FIG. 2)).

However, since, as described above, humidity rises in the inside of a large tire-wheel assembly for a construction vehicle or the like and the inside of the tire-wheel assembly is filled with a high-humidity and high-pressure gas, it is difficult even for a pressure sensor having water-resistance to completely prevent the penetration of the high-humidity and high-pressure gas into the pressure sensor. For this reason, the electronic components constituting the sensor module are prone to fail, and further improvement has been required accordingly.

To solve the problem described above, a second feature of the present invention according to the first feature of the present invention has following feature. The tire inside information acquiring device includes a sensor (pressure sensor 34, strain gauge 36) configured to detect the tire inside information, wherein the sensor is provided on an inner wall of the housing body.

When the strain gauge is used as the pressure sensor, such a structure in which a part of the pressure sensor communicates with the inside of a tire-wheel assembly no longer need be employed. In other words, in such a tire inside information acquiring device, the pressure sensor and the electronic circuit unit can be housed in the housing body formed of the nonmetallic inorganic material which is the inorganic material of the nonmetal. For this reason, even in the case where the inside of the tire-wheel assembly is filled with the high-humidity and high-pressure gas, it is possible to sufficiently prevent the permeation of moisture into the housing body.

A third feature of the present invention according to the first feature of the present invention and the second feature of the present invention, is summarized as the tire inside information acquiring device including a substrate (substrate 40) on which a component (transmitting antenna 44 and battery 46) constituting the tire inside information acquiring device and the housing body are disposed, wherein a gap is formed between the housing body and the substrate.

A fourth feature of the present invention according to the first feature of the present invention, is summarized as the tire inside information acquiring device including a substrate on which the housing body and a component constituting the tire inside information acquiring device are disposed; and an outer housing body configured to house the housing body and the substrate; wherein the outer housing body is formed of a nonmetallic material, the housing body is disposed on one surface of the substrate, the component is disposed on the other surface of the substrate, and a sealant is filled in a substrate housing portion with the substrate housed in the outer housing body in a way that the one surface of the substrate is positioned closer to an opening surface.

A fifth feature of the present invention according to the first feature of the present invention to the fourth feature of the present invention, is summarized as the tire inside information acquiring device wherein the tire inside information acquiring device is disposed under an environment of a temperature of 40 degrees or above, a state of saturated humidity, and an inner pressure of 500 kPa or above.

MODES FOR CARRYING OUT THE INVENTION

Figure 1:
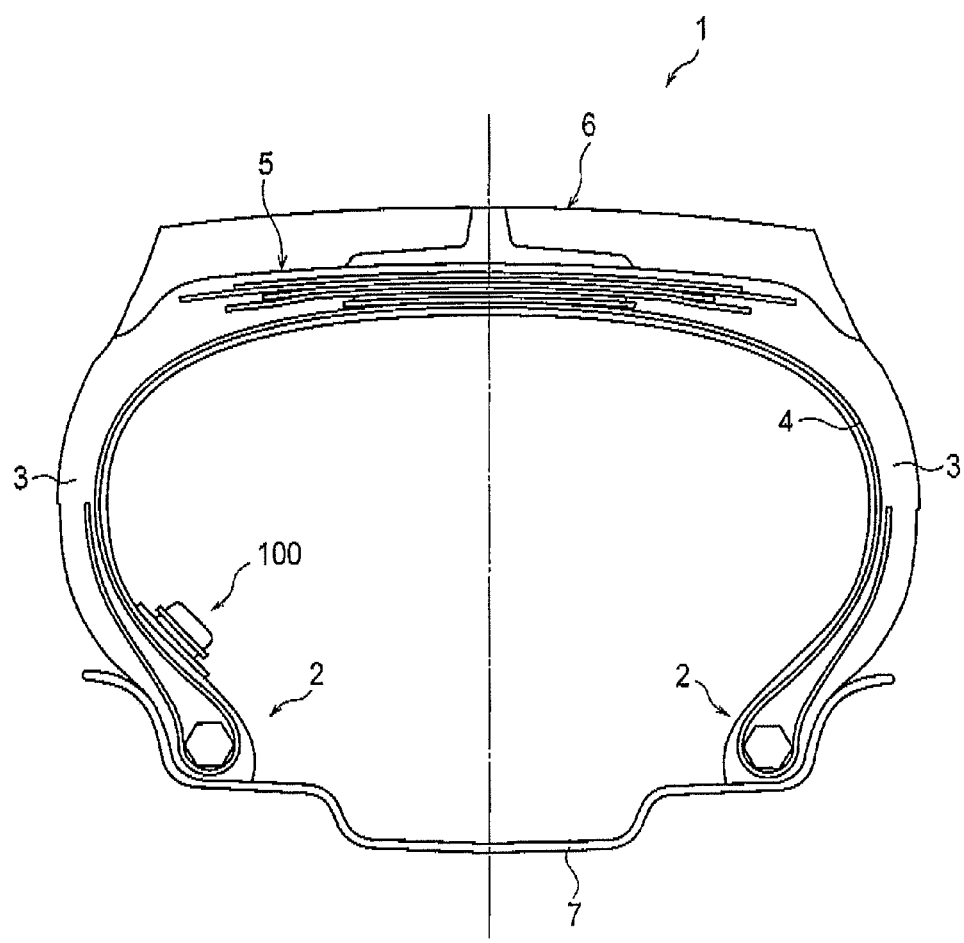
FIG. 1 is a partial cross-sectional view of a tire-wheel assembly 1 including a tire inside information acquiring device 100 of an embodiment of the present invention, the view being taken along a tread width direction.

Next, descriptions will be provided for embodiments of the present invention while referring to the drawings. Note that, in the following description of the drawing, same or similar reference signs denote same or similar elements and portions. In addition, it should be noted that the drawings are schematic and ratios of dimensions and the like are different from actual ones.

Therefore, specific dimensions and the like should be determined in consideration of the following descriptions. Moreover, the drawings also include portions having different dimensional relationships and ratios from each other.

First Embodiment

As for this embodiment, description will be given of (1) a structure of a tire-wheel assembly, (2) a detailed structure of a tire inside information acquiring device, (3) a structure of a housing body, (4) a structure of a substrate, (5) a comparative evaluation, and (6) Advantageous Effects.

(1) Structure of Tire-Wheel Assembly

FIG. 1 is a partial cross-sectional view of a tire-wheel assembly 1 including a tire inside information acquiring device 100 of an embodiment of the present invention, the view being taken along a tread width direction.

The tire inside information acquiring device 100 is attached inside the tire-wheel assembly 1. The tire inside information acquiring device 100 has acquisition means disposed inside the tire-wheel assembly 1, and configured to acquire tire inside information, which is information on the inside of the tire. In this respect, the tire inside information includes the inner pressure of the air filled inside the tire-wheel assembly 1, the temperature of the inside of the tire-wheel assembly 1, and the like. The tire inside information acquiring device 100 is attached along the inside of a rim 7.

The tire-wheel assembly 1 is a tire-wheel assembly used for a large vehicle such as a construction vehicle. The inside of the tire-wheel assembly 1 is always kept in a high-temperature and high-pressure condition for reasons such as: the large size of the tire-wheel assembly 1 for the construction vehicle or the like; and a mode of use in which, as is often the case, the vehicle continues being used for 24 consecutive hours.

Moreover, since a dedicated coolant (for example, water and LLC) are injected in the tire-wheel assembly 1, the inside of the tire-wheel assembly is filled with a high-humidity and high-pressure gas. Specifically, (approximately 50 liters of) a mixture liquid of water and LLC is injected in the tire-wheel assembly in an amount of 1/50 to 1/40 of the capacity of the tire-wheel assembly.

As shown in FIG. 1, the tire-wheel assembly 1 is formed from a tire and a rim 7 to which the tire is fixed. The tire includes a pair of bead portions 2, and a pair of side portions 3, a carcass layer 4, a belt layer 5, and a tread portion 6.

The bead portions 2 are each formed in the shape of a ring in a tire circumferential direction, and are provided on the respective two ends of the tire in the tread width direction. The bead portions 2 are reinforcing members for fixing the tire to the rim 7.

The side portions 3 are wall faces formed on the both ends of the tire in the tread width direction with the later-described tread portion 6 interposed therebetween.

The carcass layer 4 constitutes parts of the respective side portions 3, and is a layer which withstands load and impact and retains the tire structure. Both end portions of the carcass layer 4 in the tread width direction are folded back around the respective bead portions 2.

The belt layer 5 is placed between the carcass layer 4 and the later-described tread portion 6 in the tire circumferential direction.

(2) Detailed Structure of Tire Inside Information Acquiring Device

Figure 2:
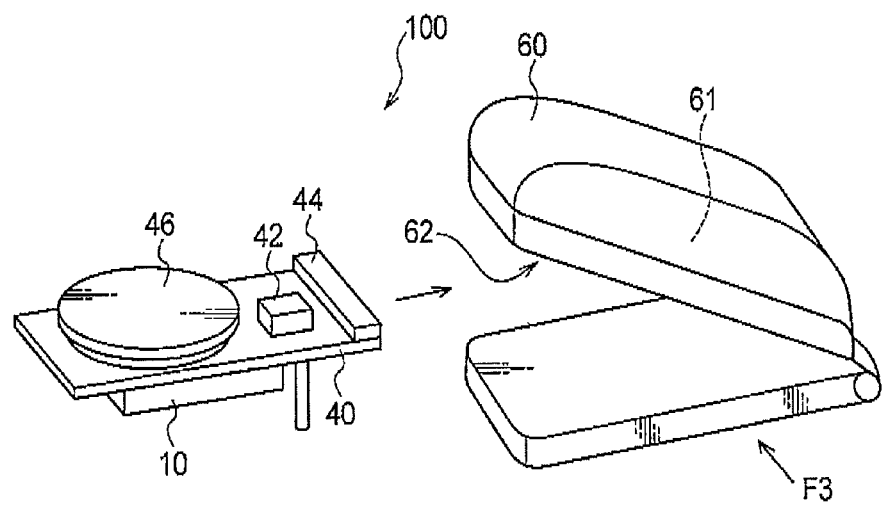
FIG. 2 is an exploded perspective view of a partial breakdown of the tire inside information acquiring device 100 of the embodiment of the present invention.

Description will be given of a detailed structure of the tire inside information acquiring device 100 by using FIG. 2. FIG. 2 is an exploded perspective view of a partial breakdown of the tire inside information acquiring device 100 of the embodiment of the present invention.

Since LLC is injected in the tire-wheel assembly 1 described above, the inside of the tire-wheel assembly is filled with a high-humidity and high-pressure gas. For example, the tire inside information acquiring device 100 is used under an environment of a temperature of 40 degrees or above, a state of saturated humidity (i.e., a relative humidity of 100%), and an inner pressure of 500 kPa or above. Specifically, the tire inside information acquiring device 100 is used in an environment of a temperature of 25 degrees to 90 degrees (64 degrees on average), a humidity of 20% to 100%, and an inner pressure of 500 kPa.

As shown in FIG. 2, the tire inside information acquiring device 100 includes a housing body 10, a substrate 40, and an outer housing body 60.

The housing body 10 and components constituting the tire inside information acquiring device 100 are placed on the substrate 40. The components include a transmitting antenna 44, and a battery 46. Detailed description thereof will be given later.

The outer housing body 60 has a substrate housing portion 61 configured to house the housing body 10 and the substrate 40. An opening surface 62 is formed in the outer housing body 60. The outer housing body 60 is formed of a nonmetallic material. Specifically, resin, ceramic, glass, or the like is preferably used as the nonmetallic material of which the outer housing body 60 is formed. For example, PPS resin (polyphenylene sulfide) or the like is used as the nonmetallic material of which the outer housing body 60 is formed.

Figure 3:
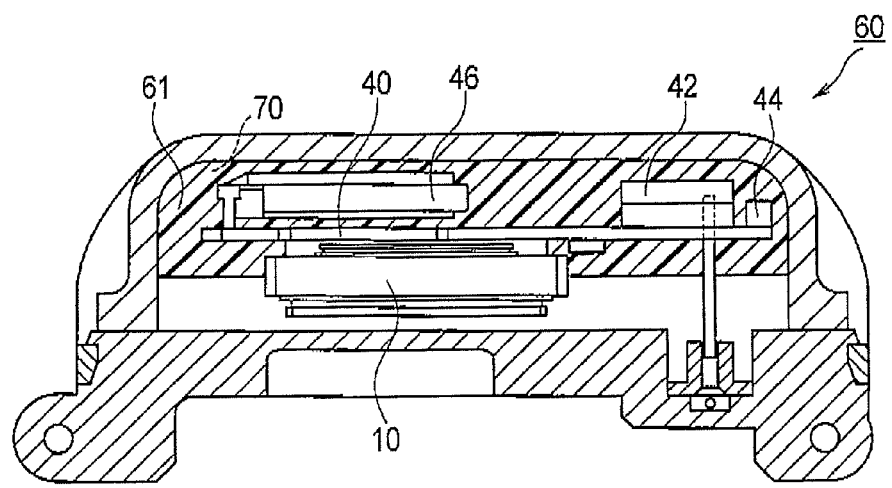
FIG. 3 is a cross-sectional view of a substrate 40 housed in the outer housing body 60 and viewed in the direction of the arrow F3 in FIG. 2.

FIG. 3 is a cross-sectional view of the substrate 40 housed in the outer housing body 60 and viewed in a direction of the arrow F3 in FIG. 2. The housing body 10 is disposed on an opening surface 62 side-surface of the substrate 40. The components are disposed on a surface of the substrate, which is opposite from the opening surface 62. The substrate housing 61 is filled with a sealant 70 with the substrate 40 housed in the outer housing body 60 in a way that the surface of the substrate 40, on which the housing body 10 is disposed, is positioned closer to the opening surface 62.

(3) Structure of Housing Body

Figure 4:
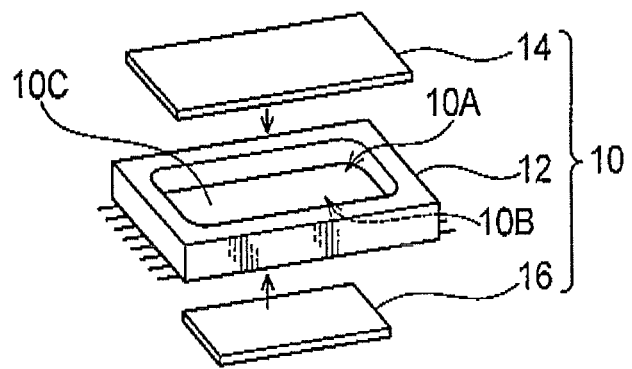
FIG. 4 is an exploded perspective view of a partial breakdown of a housing body 10 of the embodiment of the present invention.
Figure 5:
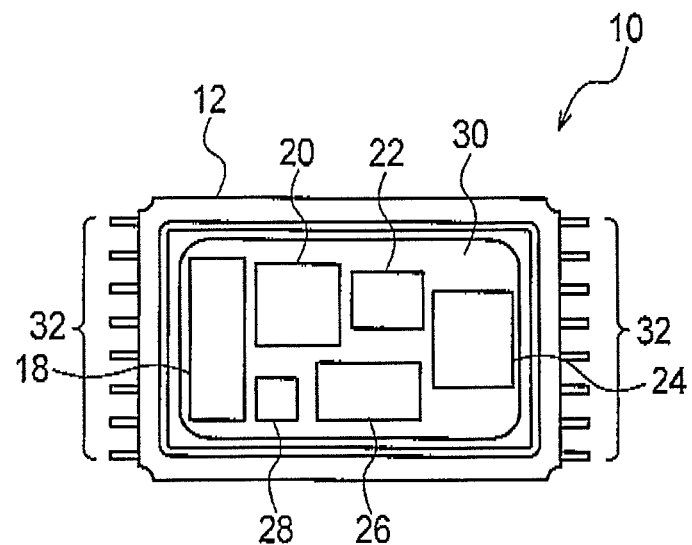
FIG. 5 is an exploded plan view of the partial breakdown of the housing body 10 of the embodiment of the present invention.
Figure 6:
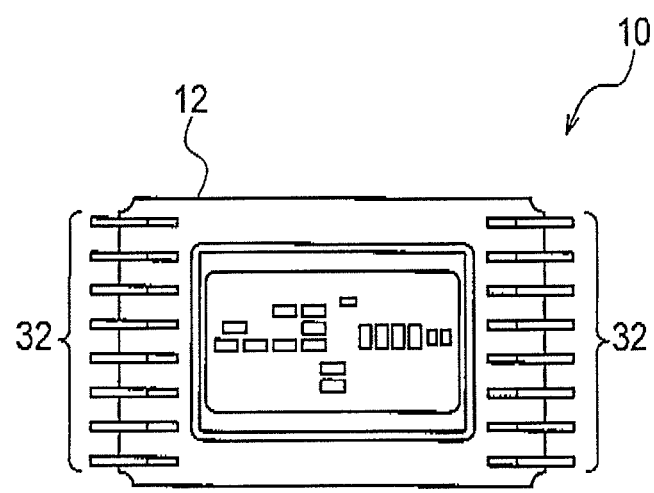
FIG. 6 is an exploded bottom view of the partial breakdown of the housing body 10 of the embodiment of the present invention.

Description will be given of a detailed structure of the housing body 10. Specifically, description will be given of (3.1) a detailed structure of the housing body, (3.2) a detailed structure of a housing body main body, and (3.3) a detailed structure of an electronic circuit unit, by use of FIGS. 4 to 6. FIG. 4 is an exploded perspective view of a partial breakdown of the housing body 10 of the embodiment of the present invention. FIG. 5 is a plan view of the housing body 10 of the embodiment of the present invention with an upper lid 14 being detached. FIG. 6 is a bottom view of the housing body 10 of the embodiment of the present invention with a lower lid 16 being detached.

(3.1) Detailed Structure of Housing Body

As shown in FIG. 4, the housing body 10 is formed from a housing body main body 12, the upper lid 14, and the lower lid 16. A housing portion 10C in which to house the electronic circuit unit, and opening surfaces 10A, 10B are formed in the housing body main body 12. The upper lid 14 and the lower lid 16 cover the respective opening surfaces 10A, 10B. The housing body 10 houses at lease the electronic circuit unit constituting the tire inside information acquiring device 100.

The housing body 10 is formed of a nonmetallic inorganic material, which is an inorganic material of a nonmetal. Specifically, ceramic or glass-ceramic is used as the nonmetallic inorganic material of which the housing body 10 is formed. For example, alumina ceramic or the like is preferably used as the nonmetallic inorganic material of which the housing body 10 is formed.

The upper lid 14 and the lower lid 16 are plate-shaped lids formed of the nonmetallic inorganic material. The housing body main body 12 includes a sealing mean for hermetically sealing the housing body 10, the upper lid 14, and the lower lid 16 with no gaps. Specifically, the upper lid 14 and the lower lid 16 are seam-welded or soldered to the housing body main body 12. The upper lid 14 and the lower lid 16 are each welded to the housing body main body 12 by the sealing mean, such as seam-welding or soldering. As a result, the electronic circuit unit is sealed inside the housing body 10.

(3.2) Detailed Structure of Rousing body Main Body

FIG. 5 is a view of the housing body 10 with the upper lid 14 being detached, the housing body 10 being viewed from the upper lid 14 side. As shown in FIG. 5, the housing body main body 12 houses thereinside at least a receiving antenna 18, and the electronic circuit unit (which will be described later). The housing body main body 12 is formed from: a substrate stack formed of a nonmetallic inorganic material; and a case formed of the nonmetallic inorganic material. For example, when ceramic is used as the nonmetallic inorganic material, the housing body main body 12 is manufactured by sintering a ceramic substrate stack and a ceramic case.

FIG. 6 is a view of the housing body 10 with the lower lid 16 being detached, the housing body 10 being viewed from the lower lid 16 side. As shown in FIG. 6, the housing body 10 includes leads 32 formed from multiple wires. The leads 32 are electrically connected to the electronic circuit unit in the housing body 10. In addition, the leads 32 are disposed in a circuit of the substrate 40. Thus, the electronic circuit unit housed in the housing body 10 is electrically connected to a circuit outside the housing body 10.

(3.3) Detailed Structure of Electronic Circuit Unit

The electronic circuit unit includes at least a microcomputer 20 (hereinafter referred to as a microcomputer 20), a radio-frequency modulation integrated circuit 22 (hereinafter referred to as a RF modulation IC 22), a capacitor 24, a quartz oscillator 26, a low-frequency demodulation integrated circuit 28 (hereinafter referred to as a LF demodulation IC 28), and an electronic circuit board 30.

The microcomputer 20 controls the rest of the electronic circuit unit. Specifically, the microcomputer 20 exchanges information signals with the rest of the electronic circuit unit. The RF modulation IC 22 modulates a signal outputted from the microcomputer 20 into a radio-frequency signal. The capacitor 24 supports the power when the voltage lowers. The quartz oscillator 26 outputs a base clock to activate the microcomputer 20. The LF demodulation IC 28 demodulates a low-frequency signal inputted into the receiving antenna 18. Electronic components including at least the microcomputer 20, the RF modulation IC 22, the capacitor 24, the quartz oscillator 26, and the LF demodulation IC 28 are disposed on the electronic circuit board 30. In addition, a circuit pattern for electrically connecting these electronic components together is formed on the electronic circuit board 30.

(4) Structure of Substrate

Figure 7:
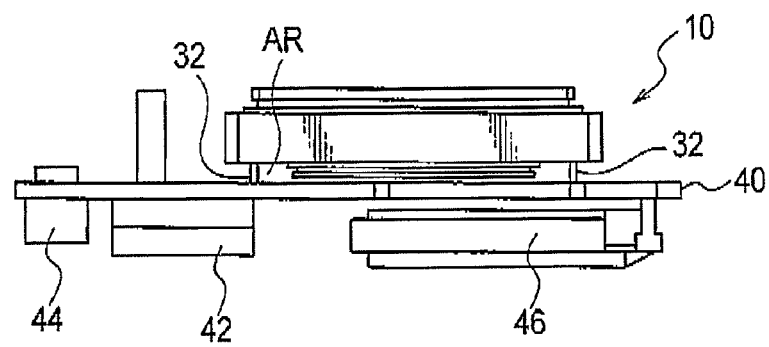
FIG. 7 is a side view of the housing body 10 and the substrate 40 of the embodiment of the present invention.
Figure 8:
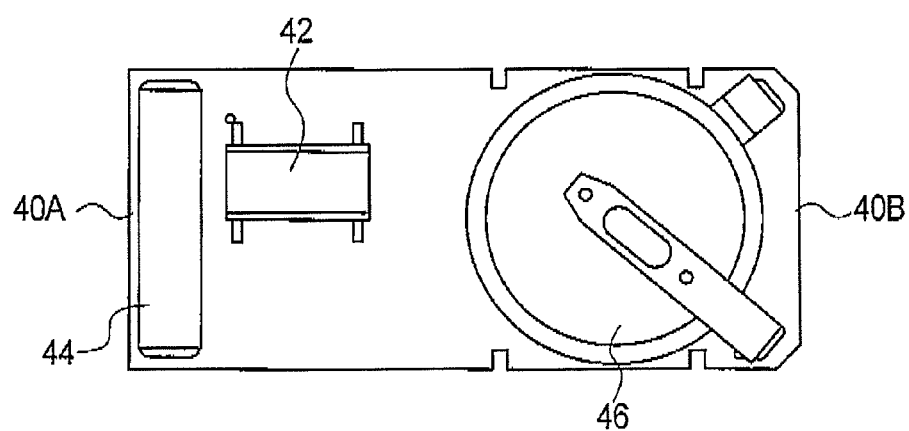
FIG. 8 is a bottom view of the substrate 40 of the embodiment of the present invention.

A detailed structure of the substrate 40 will be described. Specifically, description will be given of (4.1) a detailed structure of the substrate, and (4.2) a detailed structure of components, by using FIGS. 7 and 8. FIG. 7 is a side view of the housing body 10 and the substrate 40 of the embodiment of the invention. FIG. 8 is a bottom view of the substrate 40 of the embodiment of the present invention.

(4.1) Detailed Structure of Substrate

As shown in FIGS. 7 and 8, the housing body 10 and the components constituting the tire inside information acquiring device 100 are disposed on the substrate 40. The substrate 40 is formed of ceramic or resin. Polyimide, a liquid crystal polymer, or the like is preferably used as the resin of which the substrate 40 is formed. The housing body 10 is supported by the leads 32, and a gap AR is formed between the housing body 10 and the substrate 40.

(4.2) Detailed Structure of Components

The components are formed from only parts having water resistance. The water resistance herein means water resistance under an environment in which the tire inside information acquiring device 100 is placed, in addition to water resistance under an ordinary environment. In other words, the components have water-resistance under an environment filled with a high-humidity and high-pressure gas, in addition to ordinary water resistance.

Specifically, the components include a pressure sensor 42, and a transmitting antenna 44. The pressure sensor 42 is configured to detect the inner pressure inside the tire-wheel assembly 1. The transmitting antenna 44 is formed from a plate-shaped metal part. The transmitting antenna 44 is connected to the electronic circuit unit, and is configured to transmit at least tire inside information and a radio signal disposed outside the tire-wheel assembly 1. The battery 46 is a power source for driving the components and the electronic circuit unit.

The substrate 40 has an elongated structure in a rectangular shape, an elliptic shape, or the like. The transmitting antenna 44 is disposed on one end portion 40A of the substrate 40 in the longitudinal direction thereof, and the power source 46 is disposed on the other end portion 40B of the substrate 40 in the longitudinal direction.

(5) Advantageous Effects

As described above, in a case of the tire inside information acquiring device 100 of the embodiment of the present invention, the housing body 10 is formed of the nonmetallic inorganic material which is the inorganic material of the nonmetal, and the electronic circuit unit is sealed inside the housing body 10. The tire inside information acquiring device 100 is configured to acquire tire information including at least one of the inner pressure of the tire and the temperature of the inside of the tire-wheel assembly 1.

Such a tire inside information acquiring device 100 is capable of sufficiently preventing the permeation of moisture into the housing body 10 even in a case where the inside of the tire-wheel assembly 1 is filled with a high-humidity and high-pressure gas, because the electronic circuit unit is housed in the housing body 10 formed of the nonmetallic inorganic material which is the inorganic material of the nonmetal.

Accordingly, even when the tire inside information acquiring device 100 is attached inside the tire-wheel assembly which is filled with the high-humidity and high pressure gas due to the injection of the dedicated coolant or the like, the incidence of failure can be reduced.

In addition, in the case of this embodiment, since the housing body 10 is formed of the nonmetallic inorganic material which is the inorganic material of the nonmetal, the housing body 10 does not hinder the receiving antenna 18 from receiving a radio signal.

In addition, the components formed from only the parts having water-resistant are disposed on the substrate 40. For this reason, even in a case where moisture permeates into the tire inside information acquiring device 100, it is possible to prevent the penetration of the moisture into the housing body 10, and to suppress the occurrence of failure in the tire inside information acquiring device 100.

Accordingly, even when the tire inside information acquiring device 100 is attached inside the tire-wheel assembly 1 which is filled with the high-humidity and high-pressure gas due to the injection of the dedicated coolant or the like, the incidence of failure can be reduced.

This embodiment makes it possible to reduce the probability that the receiving antenna 18 and the electronic circuit unit will be causative factors of failure even in a case where general-purpose electronic components or the like, which may be broken in the environment filled with the high-humidity and high-pressure gas, are used for the receiving antenna 18 and the electronic circuit unit, because the receiving antenna 18 and the electronic circuit unit are housed in the housing body 10.

In this embodiment, since the components include the pressure sensor 42 configured to detect the inner pressure inside the tire-wheel assembly 1, the tire inside information acquiring device 100 is capable of measuring the inner pressure of the air filled in the tire-wheel assembly 1.

In this embodiment, since the components include the transmitting antenna 44 which is connected to the electronic circuit unit and which is configured to transmit the radio signal, the tire inside information acquiring device 100 is capable of transmitting the acquired tire inside information to a device disposed outside. Specifically, the tire inside information acquiring device 100 is capable of functioning as a device configured to transmit: the production number of the tire; or information on the pressure of the inside of the tire-wheel assembly 1 if the pressure sensor 42 is provided.

The substrate 40 of the tire inside information acquiring device 100 has the elongated structure in a rectangular shape, an elliptic shape, or the like. The transmitting antenna 44 is disposed on the end portion 40A of the substrate 40 in the longitudinal direction thereof, and the power source 46 is disposed on the other end portion 40B of the substrate 40 in the longitudinal direction thereof. Specifically, the transmitting antenna 44 and the power source 46 are disposed on the same substrate 40, but at their respective positions away from each other. Accordingly, it is possible to prevent communication failure which would otherwise occur due to the power source 46 during communications.

In this embodiment, since the housing body 10 and the substrate 40 are housed in the outer housing body 60 formed of the nonmetallic material which is the material of the nonmetal, the outer housing body 60 is capable of preventing the penetration of the moisture except for a gas whose humidity and pressure are so high that the gas permeates through the nonmetallic material. In other words, since the tire inside information acquiring device 100 is capable of further preventing the penetration of the moisture into the tire inside information acquiring device 100, the incidence of failure can be further reduced.

In this embodiment, since the nonmetallic inorganic material is any one of the ceramic and the glass-ceramic, the receiving antenna 18 is capable of receiving the radio signal even when disposed inside the housing body 10. Because the receiving antenna 18 can be disposed inside the housing body 10, the receiving antenna 18 is not exposed to the moisture. As a result, the incidence of failure can be further reduced.

In this embodiment, because the resin is used as the nonmetallic material, the outer housing body 60 is capable of preventing the penetration of the moisture except for the gas whose humidity and temperature are so high that the gas permeates through the resin. In addition, since the outer housing body 60 of the resin can be easily formed, the production costs can be suppressed.

In this embodiment, the components include the battery 46 which is a power source for the components and the electronic circuit unit. For this reason, the tire inside information acquiring device 100 need not be supplied with electricity from the outside, and accordingly can be used repeatedly by replacing the battery 46.

In this embodiment, the gap is formed between the housing body 10 and the substrate 40. Hence, when vibration or heat is generated in the housing body 10 and the substrate 40, the transmission of the vibration or heat therebetween can be suppressed. In other words, in the tire inside information acquiring device 100, unnecessary transmission of the vibration or heat can be suppressed between the housing body 10 and the substrate 40 whose structures are different from each other, and the incidence of failure can be reduced.

In this embodiment, even in the case where the tire inside information acquiring device 100 is used under the environment of a temperature of 40 degrees or above, a state of saturated humidity, and an inner pressure of 500 kPa or above, the tire inside information acquiring device 100 is capable of sufficiently preventing the permeation of the moisture into the housing body 10. Hence, the incidence of failure can be reduced.

The housing body 10 is disposed on the opening surface 62-side surface of the substrate 40, whereas the components are disposed on the other surface of the substrate, which is opposite from the opening surface 62. The substrate housing 61 is filled with the sealant 70 with the substrate 40 housed in the outer housing body 60 in a way that the surface of the substrate 40, on which the housing body 10 is disposed, is positioned closer to the opening surface 62 side. The substrate 40 on which the housing body 10, the battery 46, and the like are disposed is fixed with the sealant 70 while accommodated in the outer housing body 60. For this reason, moisture is less likely to directly touch the substrate 40 on which the housing body 10, the battery 46, and the like are disposed, so that the waterproofing effects are enhanced.

Particularly, since the housing body 10 itself is hermetically sealed with the sealing mean such as seam-welding or soldering, no moisture penetrates into the housing body 10 even when the entirety of the housing body 10 is not completely buried in the sealant 70. For this reason, the precision tolerance of the operation for filling the sealant 70 can be made larger. Accordingly, the operation efficiency can be improved.

As described above, in the tire-wheel assembly 1 including the tire inside information acquiring device 100 of this embodiment, the receiving antenna 18 and the electronic circuit unit are housed in the housing body 10 formed of the nonmetallic inorganic material which is the inorganic material of the nonmetal. Hence, even in the case where the tire-wheel assembly 1 is filled with the high-humidity and high-pressure gas, the housing body 10 is capable of sufficiently preventing the permeation of the moisture into the housing body 10. In addition, the housing body 10 is formed of the nonmetallic inorganic material which is the inorganic material of the nonmetal. Thus, the housing body 10 does not hinder the receiving antenna 18 from receiving the radio signal. Furthermore, the components formed from only the parts having water-resistance are disposed on the substrate 40. Hence, even in the case where the moisture penetrates into the tire inside information acquiring device 100, it is possible to suppress the probability that the components will be causative factors of failure in the tire inside information acquiring device 100.

Accordingly, the tire-wheel assembly 1 can include the tire inside information acquiring device 100 whose incidence of failure is reduced, even in the case where the tire inside information acquiring device 100 is attached inside the tire-wheel assembly 1 which is filled with the high-humidity and high-pressure gas due to the injection of the dedicated coolant or the like.

Second Embodiment

In a second embodiment, constituents having the same Advantageous Effects as those of the first embodiment are denoted by the same reference numerals, and detailed description thereof is omitted. The second embodiment is different from the first embodiment in the structure of the pressure sensor. Hereinafter, description will be given of (1) a detailed structure of a tire inside information acquiring device, (2) a structure of a housing body, and (3) Advantageous Effects.

As in the case with the embodiment shown in FIG. 1, a tire inside information acquiring device 101 of the embodiment of the present invention is attached inside the tire-wheel assembly 1, and acquires tire inside information, which is information on the inside of the tire. Here, the tire inside information includes the inner pressure of the air filled in the tire-wheel assembly 1, the temperature of the inside of the tire-wheel assembly 1, and the like.

(1) Detailed Structure of Tire Inside Information Acquiring Device

Figure 9:
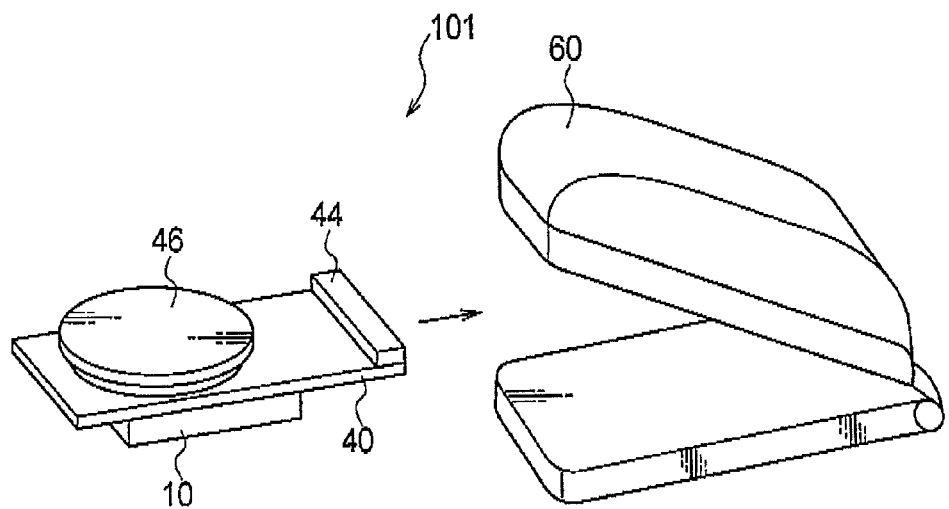
FIG. 9 is an exploded perspective view of a partial breakdown of a tire inside information acquiring device 101 of another embodiment of the present invention.

Description will be given of a detailed structure of the tire inside information acquiring device 101 by using FIG. 9. FIG. 9 is an exploded perspective view of a partial breakdown of the tire inside information acquiring device 101 of the embodiment of the present invention.

As shown in FIG. 9, the tire inside information acquiring device 101 includes a housing body 10, a substrate 40, and an outer housing body 60. The housing body 10 and components constituting the tire inside information acquiring device 101 are placed on the substrate 40. The components include a transmitting antenna 44, and a battery 46.

(2) Structure of Housing Body

Figure 10:
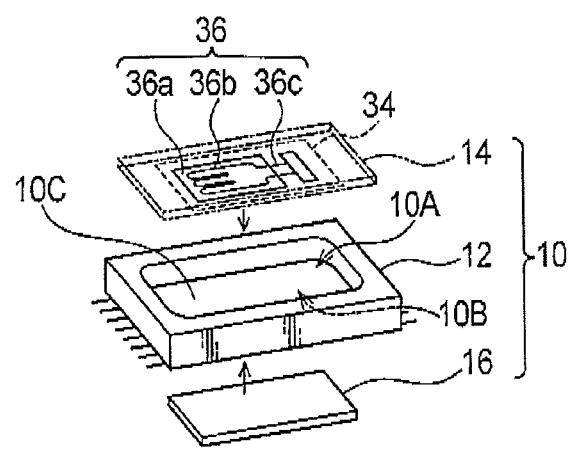
FIG. 10 is an exploded perspective view of the partial breakdown of the housing body 10 of the embodiment of the present invention.
Figure 11:
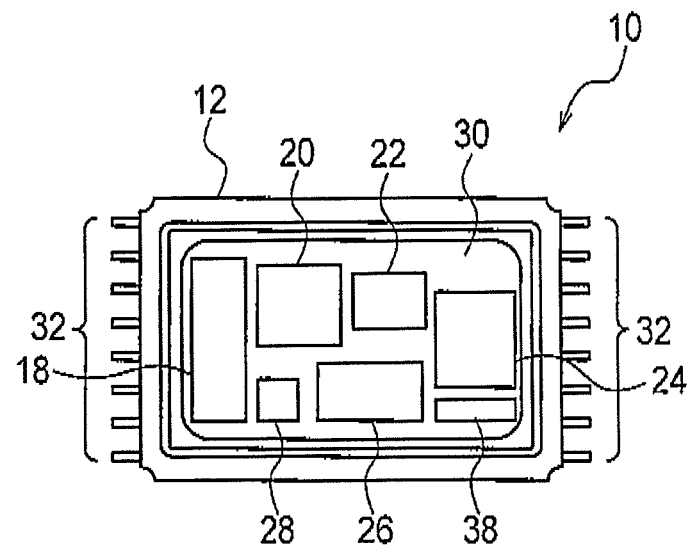
FIG. 11 is an exploded plan view of the partial breakdown of the housing body 10 of the embodiment of the present invention.

A detailed structure of the housing body 10 will be described by using FIGS. 10 to 12. FIG. 10 is an exploded perspective view of a partial breakdown of the housing body 10 of the embodiment of the present invention. FIG. 11 is a plan view of the housing body 10 of the embodiment of the present invention with the upper lid 14 being detached.

As shown in FIG. 10, the housing body 10 is formed from a housing body main body 12, the upper lid 14, and a lower lid 16. The housing body 10 has a pressure sensor 34 configured to detect the inner pressure of the tire-wheel assembly. In the second embodiment, the pressure sensor is a strain gauge configured to detect strain. The housing body 10 includes: the pressure sensor 34; and an electronic circuit unit which is connected to the pressure sensor 34, and which constitutes the tire inside information acquiring device 101.

The pressure sensor 34 includes a strain gauge 36 configured to detect strain of the housing body 10 based on the change in electrical resistance of a resistor.

The strain gauge 36 is adhered to an inner wall of the housing body. Specifically, the strain gauge 36 is adhered to the inside of the housing body 10, specifically, the inside of the lid 14 with a dedicated adhesive. The strain gauge 36 does not have to be adhered to the inner wall of the housing body main body 12, but may be adhered to an inner wall of the housing body main body 12 or the lower lid 16. For example, the strain gauge 36 is formed from a base body 36a of a thin electrical insulator; a resistor 36b stacked on the base body 36a and formed like a grid; and leads 36c connected to the resistor 36b.

Note that the strain gauge 36 does not necessarily have to be adhered to the inner wall of the housing body with the adhesive, and that the strain gauge may be adhered to the inner wall of the housing body with, for example, a cover sheet or the like. In addition, the adhesion of the strain gauge 36 to the inner wall of the housing body includes a state where the strain gauge 36 is in contact with the inner wall of the housing body.

As shown in FIG. 11, the housing body main body 12 houses at least the electronic circuit unit. In the second embodiment, the electronic circuit unit includes a temperature sensor 38 in addition to the structure of the electronic circuit unit described by using FIG. 5. The temperature sensor 38 may be in contact with the inner wall of the housing body.

Description will be given of a detailed structure of the substrate 40. FIG. 12 is a side view of the housing body 10 and the substrate 40 of the second embodiment of the present invention.

Figure 12:
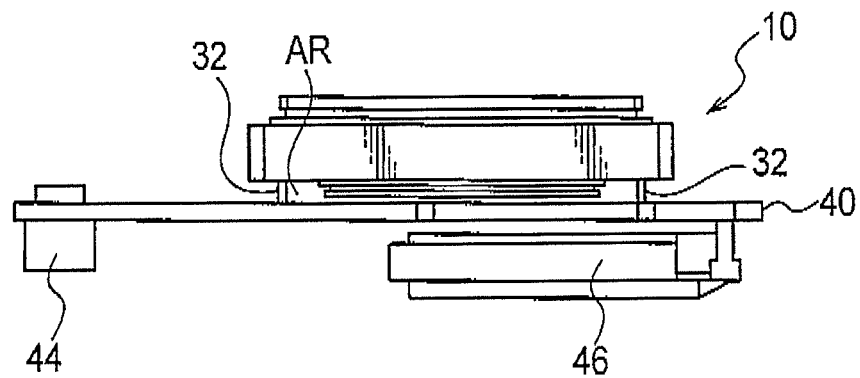
FIG. 12 is a side view of a housing body 10 and a substrate 40 of the embodiment of the present invention.

As shown in FIG. 12, the housing body 10, and components constituting the tire inside information acquiring device 101 are disposed on the substrate 40. The housing body 10 is supported by the leads 32, and a gap AR is formed between the housing body 10 and the substrate 40.

(3) Advantageous Effects

As described above, in the tire inside information acquiring device 101 of this embodiment, the electronic circuit unit has the pressure sensor 34 and the temperature sensor 38; the pressure sensor 34 and the temperature sensor 38 are disposed on the inner wall of the housing body 10; and the pressure sensor 34 includes the strain gauge 36 configured to detect the strain of the inner wall of the housing body 10.

For this reason, the pressure sensor 34 includes the strain gauge 36 configured to detect the strain of the housing body 10, so that the inner pressure of the tire-wheel assembly 1 can be detected. Accordingly, the pressure sensor 34 does not necessarily have to have a structure in which a part of the pressure sensor 34 communicates with the inside of the tire-wheel assembly 1.

In this embodiment, the electronic circuit unit includes the temperature sensor 38 configured to detect the temperature of the inside of the tire-wheel assembly. The temperature sensor 38 is provided on the inner wall of the housing body 10, and is capable of detecting the temperature of the outside (i.e., the inside of the tire-wheel assembly 1) through the inner wall of the housing body 10.

In other words, in such a tire inside information acquiring device 101, the pressure sensor 34, the temperature sensor 38 and the electronic circuit unit are housed in the housing body 10 formed of the nonmetallic inorganic material which is the inorganic material of the nonmetal. Hence, the housing body 10 is capable of sufficiently preventing the permeation of moisture into its inside even in a case where the inside of the tire-wheel assembly 1 is filled with a high-humidity and high-pressure gas.

In addition, the components formed from only the parts having water-resistant are disposed on the substrate 40. For this reason, even in a case where the moisture permeates into the tire inside information acquiring device 101, it is possible to suppress the probability that the components will be causative factors of failure in the tire inside information acquiring device 101.

Accordingly, the tire inside information acquiring device 101 is capable of reducing the incidence of failure even in a case where the tire inside information acquiring device 101 is disposed inside the tire-wheel assembly 1 which is filled with the high-humidity and high-pressure gas due to the injection of the dedicated coolant or the like.

This embodiment makes it possible to reduce the probability that the pressure sensor 34 and the electronic circuit unit will be causative factors of failure even in a case where general-purpose electronic components or the like, which may be broken in an environment filled with the high-humidity and high-pressure gas, are used for the pressure sensor 34 and the electronic circuit unit, because the pressure sensor 34 and the electronic circuit unit are housed in the housing body 10.

In this embodiment, since the electronic circuit unit includes the receiving antenna 18 configured to detect a radio signal, the tire inside information acquiring device 101 is capable of receiving the radio signal from the outside of the tire-wheel assembly 1 through the receiving antenna 18. In addition, since the housing body 10 is formed of the nonmetallic inorganic material which is the inorganic material of the nonmetal, the housing body 10 does not hinder the receiving antenna 18 from receiving a radio signal.

Furthermore, in this embodiment, since the components include the transmitting antenna 44 which is connected to the electronic circuit unit and which is configured to transmit the radio signal, the tire inside information acquiring device 101 is capable of transmitting the pressure of the inside of the tire-wheel assembly 1 to a device disposed outside. Moreover, the tire inside information acquiring device 101 is capable of transmitting the production number of the tire and the temperature sensor 38.

In this embodiment, since the housing body 10 and the substrate 40 are housed in the outer housing body 60 formed of the nonmetallic material which is the material of the nonmetal, the outer housing body 60 is capable of preventing the penetration of the moisture except for a gas whose humidity and pressure are so high that the gas permeates through the nonmetallic material. In other words, since the tire inside information acquiring device 101 is capable of further preventing the penetration of the moisture into the tire inside information acquiring device 101, the incidence of failure can be further reduced.

In this embodiment, since the nonmetallic inorganic material is any one of the ceramic and the glass-ceramic, the receiving antenna 18 is easy to receive the radio signal, and it is possible to further prevent the penetration of the moisture into the housing body 10.

In this embodiment, because the resin is used as the nonmetallic material, the outer housing body 60 is capable of preventing the penetration of the moisture except for the gas whose humidity and temperature are so high that the gas permeates through the resin. In addition, since the outer housing body 60 of the resin can be easily formed, the production costs can be suppressed.

In this embodiment, the components include the battery 46 configured to supply an electric power needed for the components and the electronic circuit unit. For this reason, the tire inside information acquiring device 101 need not be supplied with electricity from the outside, and accordingly can be used repeatedly by replacing the battery 46.

In this embodiment, the gap is formed between the housing body 10 and the substrate 40. Hence, when vibration or heat is generated in the housing body 10 and the substrate 40, the transmission of the vibration or heat therebetween can be suppressed. In other words, in the tire inside information acquiring device 100, unnecessary transmission of the vibration or heat can be suppressed between the housing body 10 and the substrate 40 whose structures are different from each other, and the incidence of failure can be reduced.

In this embodiment, even in the case where the tire inside information acquiring device 101 is used under the environment of a temperature of 40 degrees or above, a state of saturated humidity, and an inner pressure of 500 kPa or above, the tire inside information acquiring device 101 is capable of sufficiently preventing the permeation of the moisture into the housing body 10. Hence, the incidence of failure can be reduced.

As described above, in the tire-wheel assembly 1 including the tire inside information acquiring device 101 of this embodiment, the pressure sensor 34, the temperature sensor 38 and the electronic circuit unit are housed in the housing body 10 formed of the nonmetallic inorganic material which is the inorganic material of the nonmetal. Hence, even in the case where the tire-wheel assembly 1 is filled with the high-humidity and high-pressure gas, the housing body 10 is capable of sufficiently preventing the permeation of the moisture into the housing body 10. Furthermore, the components formed from only the parts having water-resistance are disposed on the substrate 40. Hence, even in the case where the moisture penetrates into the tire inside information acquiring device 101, it is possible to suppress the probability that the components will be causative factors of failure in the tire inside information acquiring device 101.

Accordingly, the tire-wheel assembly 1 can include the tire inside information acquiring device 101 whose incidence of failure is reduced, even in the case where the tire inside information acquiring device 101 is attached inside the tire-wheel assembly 1 which is filled with the high-humidity and high-pressure gas due to the injection of the dedicated coolant or the like.

[Comparative Evaluation]

To further clarify the effects of the invention, description will be given of comparative evaluation conducted on pneumatic tires of Comparative Example and Example which will be described below. Specifically, description will be given of (1) an evaluation method, and (2) evaluation results. Note that these examples impose no specific restriction on the present invention.

(1) Evaluation Method

By using tire-wheel assemblies each including one of two kinds of tire inside information acquiring devices, the temperature durability thereof was evaluated. Data on the pneumatic tires were measured under conditions shown below.

Coolant in tire-wheel assembly: water and dedicated coolant (mixing ratio: 0:100, i.e., dedicated coolant alone)

Coolant injection amount/inner capacity of tire-wheel assembly: 1/50 (50 liters)

Humidity: 100% relative humidity (saturated state)

Pressure: 1 MPa (Durability Comparison Test)

Evaluation method: for each tire-wheel assembly, the inside of the tire-wheel assembly was held in environments of the respective set temperatures (65° C., 80° C., and 100° C.), and the time (lifetime) before each sensor module was broken was measured.

The tire inside information acquiring device 100 described by using FIGS. 2 to 8 was attached in the tire-wheel assemblies of Example. Meanwhile, instead of the housing body 10 formed of the nonmetallic inorganic material, a housing body formed of resin (PPS) was used in the tire inside information acquiring devices attached in the respective tire-wheel assemblies of Comparative Example.

Specifically, the pressure sensor is housed in the housing body 10 of the nonmetallic inorganic material in each tire inside information acquiring device 100 of Example, whereas the pressure sensor is housed in the housing body 10 of the resin (PPS) in each tire inside information acquiring device of Comparative Example.

(2) Evaluation Results

Figure 13:
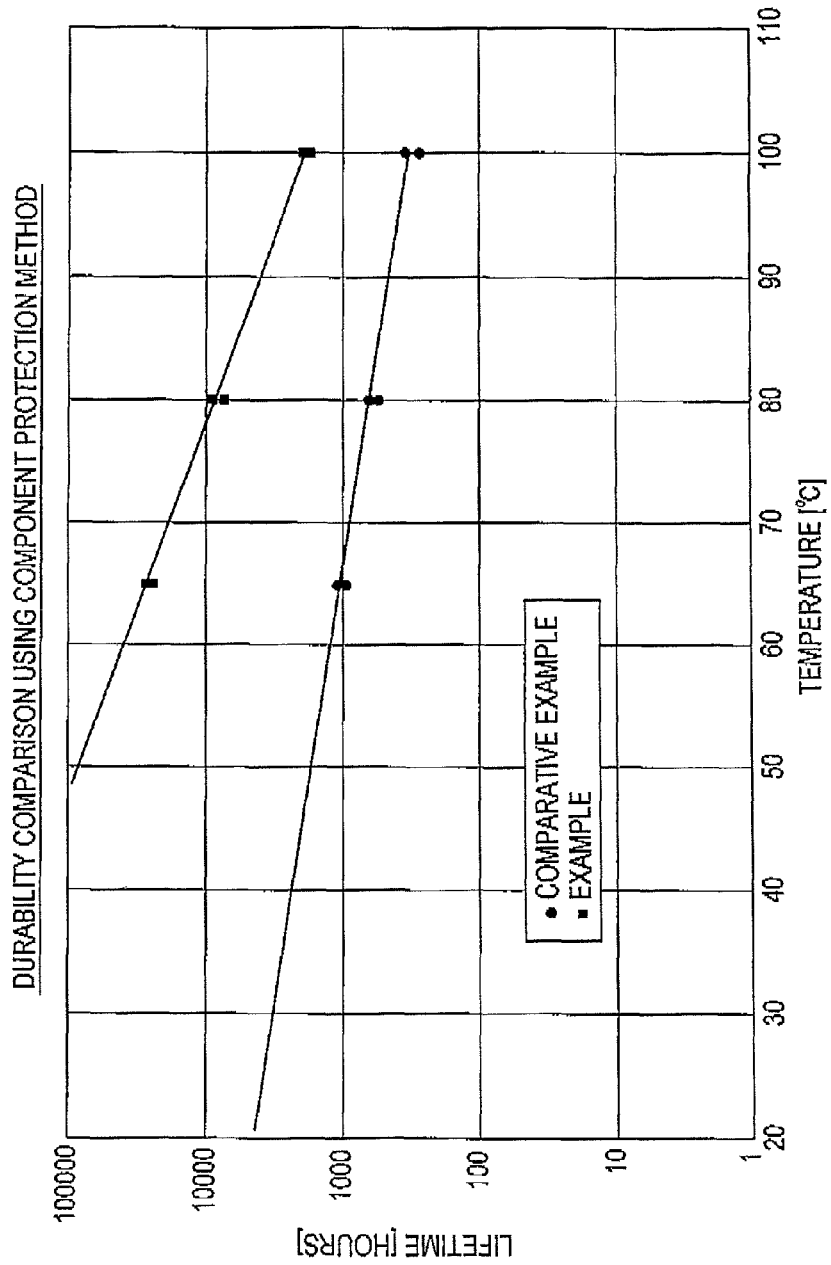
FIG. 13 is a diagram showing the lifetime of the tire inside information acquiring device against set temperatures for the inside of its tire-wheel assembly of the embodiment of the present invention.

The evaluation results are described with reference to FIG. 13. FIG. 13 is a diagram showing the lifetime of each tire inside information acquiring device against the set temperatures for the inside of its tire-wheel assembly. As shown in FIG. 13, it was found that the tire inside information acquiring devices provided to the tire-wheel assemblies of Comparative Example were shorter in lifetime at all setting temperatures than the tire inside information acquiring devices provided to the tire-wheel assemblies of Example.

As described above, the details of the present invention have been disclosed by using the embodiments of the present invention. However, it should not be understood that the description and drawings which constitute part of this disclosure limit the present invention. From this disclosure, various alternative embodiments, examples, and operation techniques will be easily found by those skilled in the art.

For example, the first embodiment can be modified as follows. The transmitting antenna 44 is disposed on the substrate 40 in the first embodiment. However, the present invention is not limited thereto, and the transmitting antenna 44 may be housed in the housing body 10. In such a case, for example, when the transmitting antenna does not have water resistance (for example, a coil-shaped transmitting antenna), the transmitting antenna is protected from the high-humidity and high-pressure gas by the housing body 10 as in the case with the above-described embodiment. In addition, since the housing body 10 is formed of the nonmetallic inorganic material which is the inorganic material of the nonmetal, the housing body 10 does not hinder the transmitting antenna from transmitting the radio signal.

In addition, in the first embodiment, the transmitting antenna 44 is not housed in the housing body 10, but disposed on the substrate 40, whereas the receiving antenna is housed in the housing body 10. However, the present invention is not limited thereto, and these are interchangeable. Specifically, an arrangement scheme may be adopted in which: the transmitting antenna is housed in the housing body 10; and the receiving antenna is not housed in the housing body 10, but disposed on the substrate 40. However, in such a case, a requirement is that the receiving antenna should have water-resistance even under the environment filled with the high-humidity and high-pressure gas.

The electronic circuit unit may include a temperature sensor configured to detect the temperature of the inside of the tire-wheel assembly 1. In this case, the tire inside information acquiring device 100 is capable of functioning as a device for communication of information on the temperature of the inside of the tire-wheel assembly 1.

As for the first embodiment, the tire inside information acquiring device 100 has been described as being disposed inside the tire side portions 3. However, the position in which the tire inside information acquiring device 100 is disposed is not limited to the position shown in FIG. 1. For example, the tire inside information acquiring device 100 may be disposed on the rim 7, or may be disposed on an inner surface of the tread layer 6. Alternatively, the tire inside information acquiring device 100 may be attached along the inner surface of the tire, for example. Moreover, the tire inside information acquiring device 100 may be buried in the tread, or the rim 7.

In the first embodiment, the ceramic or the glass-ceramic is used as the nonmetallic inorganic material of which the housing body 10 is formed, but the nonmetallic inorganic material is not limited thereto. It suffices that the nonmetallic inorganic material has an extremely high magnetic permeability, and has a property which allows magnetism to pass therethrough. Specifically, the nonmetallic inorganic material may be formed of glass fiber.

In the second embodiment, the transmitting antenna 44 is disposed on the substrate 40. However, the present invention is not limited thereto, and the transmitting antenna 44 may be housed in the housing body 10. In such a case, for example, even when the transmitting antenna does not have water resistance (for example, a coil-shaped transmitting antenna), the transmitting antenna is protected from the high-humidity and high-pressure gas by the housing body 10 as in the case with the above-described embodiment. In addition, since the housing body 10 is formed of the nonmetallic inorganic material which is the inorganic material of the nonmetal, the housing body 10 does not hinder the transmitting antenna from transmitting the radio signal.

Moreover, in the second embodiment, the transmitting antenna 44 is not housed in the housing body 10, but disposed on the substrate 40, whereas the receiving antenna is housed in the housing body 10. However, the present invention is not limited thereto, and these are exchangeable. Specifically, an arrangement scheme may be adopted in which: the transmitting antenna is housed in the housing body 10; and the receiving antenna is not housed in the housing body 10, but disposed on the substrate 40. However, in such a case, a requirement is that the receiving antenna should have water-resistance even under the environment filled with the high-humidity and high-pressure gas.

In the second embodiment, the receiving antenna 18 and the temperature sensor 38 are housed in the housing body 10. However, the present invention is not limited thereto. The receiving antenna and the temperature sensor may be disposed on the substrate 40. In such a case, a requirement is that the receiving antenna and the temperature sensor should have water-resistance even under the environment filled with the high-humidity and high-pressure gas.

In the second embodiment, the tire inside information acquiring device 101 is disposed along the inside of the rim 7. However, the present invention is not limited thereto, and the tire inside information acquiring device 101 may be attached in the tire-wheel assembly 1, for example, by attaching the tire inside information acquiring device 101 along the inner surface of the tire, or by embedding the tire inside information acquiring device 101 in the tread.

In the second embodiment, the ceramic or the glass-ceramic is used as the nonmetallic inorganic material of which the housing body 10 is formed. However, the nonmetallic inorganic material is not limited thereto. It suffices that the nonmetallic inorganic material has an extremely high magnetic permeability, and has a property which allows magnetism to pass therethrough. Specifically, the nonmetallic inorganic material may be formed of glass fiber.

In the second embodiment, the housing body 10 is formed from the housing body main body 12, the upper lid 14, and the lower lid 16. However, the housing body 10 is not limited thereto, and the housing body may be formed from: a box-shaped housing body main body having a bottom portion; and the upper lid 14.

As for the first and second embodiments, as the power source, the battery 46 has been described as being disposed in the tire inside information acquiring devices 100, 101. However, a power generation unit formed from a piezoelectric element may be provided instead of the battery 46. The provision of the power generation unit formed from the piezoelectric element makes it possible to generate power by the inner pressure of the tire-wheel assembly. Alternatively, a power generation unit including an antenna coil which generates excitation power in response to change in the magnetic field may be provided instead of the battery 46. When the power generation unit including the antenna coil is used, a fixed magnetic field for generating the excitation power in the coil is disposed together.

As described above, the use of the power generation unit formed from the piezoelectric element or the power generation unit including the antenna coil makes it possible to permanently supply power, and eliminates the need for the change of the battery 46.

As described above, the present invention naturally includes various embodiments which are not described herein. Accordingly, the technical scope of the present invention should be determined only by the matters to define the invention in the scope of claims regarded as appropriate based on the description.

Note that the entire content of Japanese Patent Application No. 2008-313289 (filed on Dec. 9, 2008) and the entire content of Japanese Patent Application No. 2008-323843 (filed on Dec. 19, 2008) are incorporated herein by reference.

INDUSTRIAL APPLICABILITY

As described above, the present invention can be applied to a tire inside information acquiring device which is attached inside a tire-wheel assembly filled with a high-humidity and high-pressure gas due to the injection of a dedicated coolant or the like, and which is configured to acquire the inner pressure of the tire, the temperature of the inside of the tire-wheel assembly, and the like.

The invention claimed is:

1. A tire inside information acquiring device attached inside a tire-wheel assembly and configured to acquire tire inside information, which is information on the inside of the tire, the tire inside information acquiring device comprising: an electronic circuit unit; a housing body configured to house the electronic circuit unit; and a sealing mean configured to hermetically seal the housing body with no gaps, a substrate on which a component constituting the tire inside information acquiring device and the housing body are disposed, wherein the housing body is formed of a nonmetallic inorganic material, and a gap is formed between the housing body and the substrate~a substrate on which the housing body and a component constituting the tire inside information acquiring device are disposed; and an outer housing body configured to house the housing body and the substrate; wherein the outer housing body is formed of a nonmetallic material, the housing body is disposed on one surface of the substrate, the component is disposed on another surface of the substrate, and a sealant is filled in a substrate housing portion with the substrate housed in the outer housing body in a way that the one surface of the substrate is positioned closer to an opening surface; wherein the housing body is interposed between the gap and the sealant.

2. The tire inside information acquiring device of claim 1, comprising a sensor configured to detect the tire inside information, wherein the sensor is provided on an inner wall of the housing body.

3. The tire inside information acquiring device of claim 1, wherein the tire inside information acquiring device is disposed under an environment of a temperature of 40 degrees or above, a state of saturated humidity, and an inner pressure of 500 kPa or above.

4. The tire inside information acquiring device of claim 1, wherein the housing body is interposed between the gap and the sealant.

5. The tire inside information acquiring device of claim 1, wherein the sealant covers a surface, provided on the substrate side, of the housing body, and the gap covers the other surface of the housing body.

* * * * *